W. FETZ.
PHOTOGRAPHIC FILM HOLDER.
APPLICATION FILED MAY 6, 1918.
1,294,079.
Patented Feb. 11, 1919.
2 SHEETS—SHEET 2.
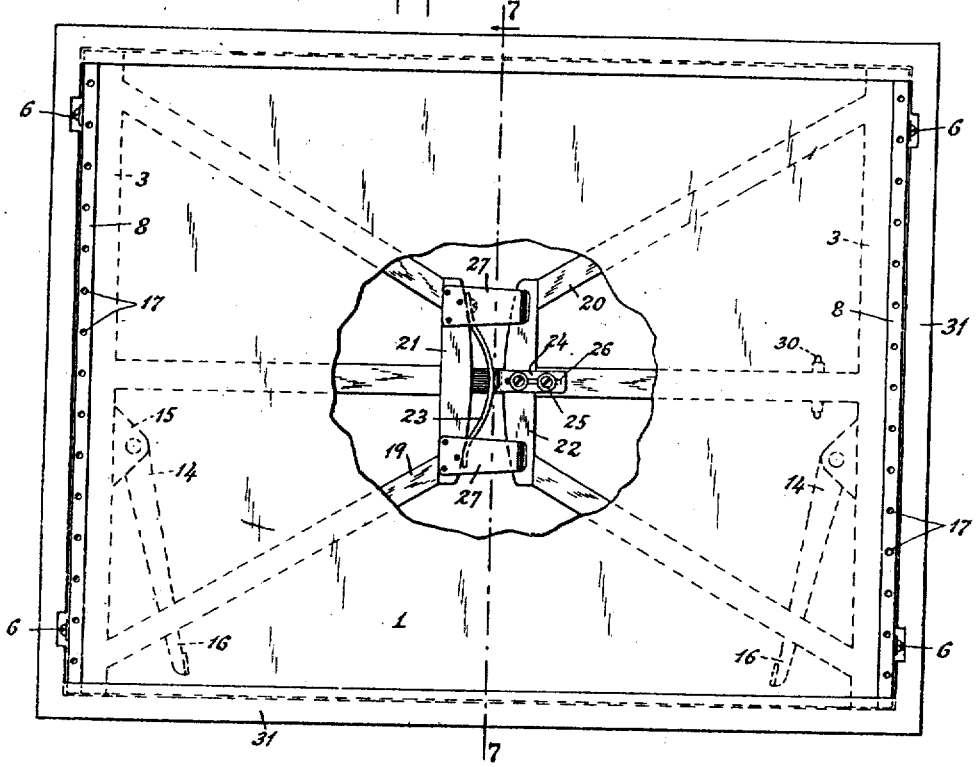
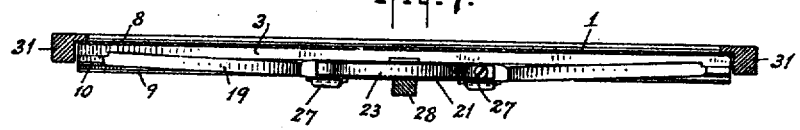
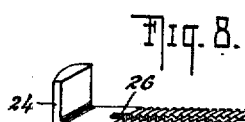 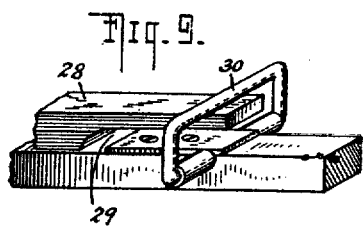
WITNESSES
INVENTOR
WERNER FETZ
ATTORNEYS

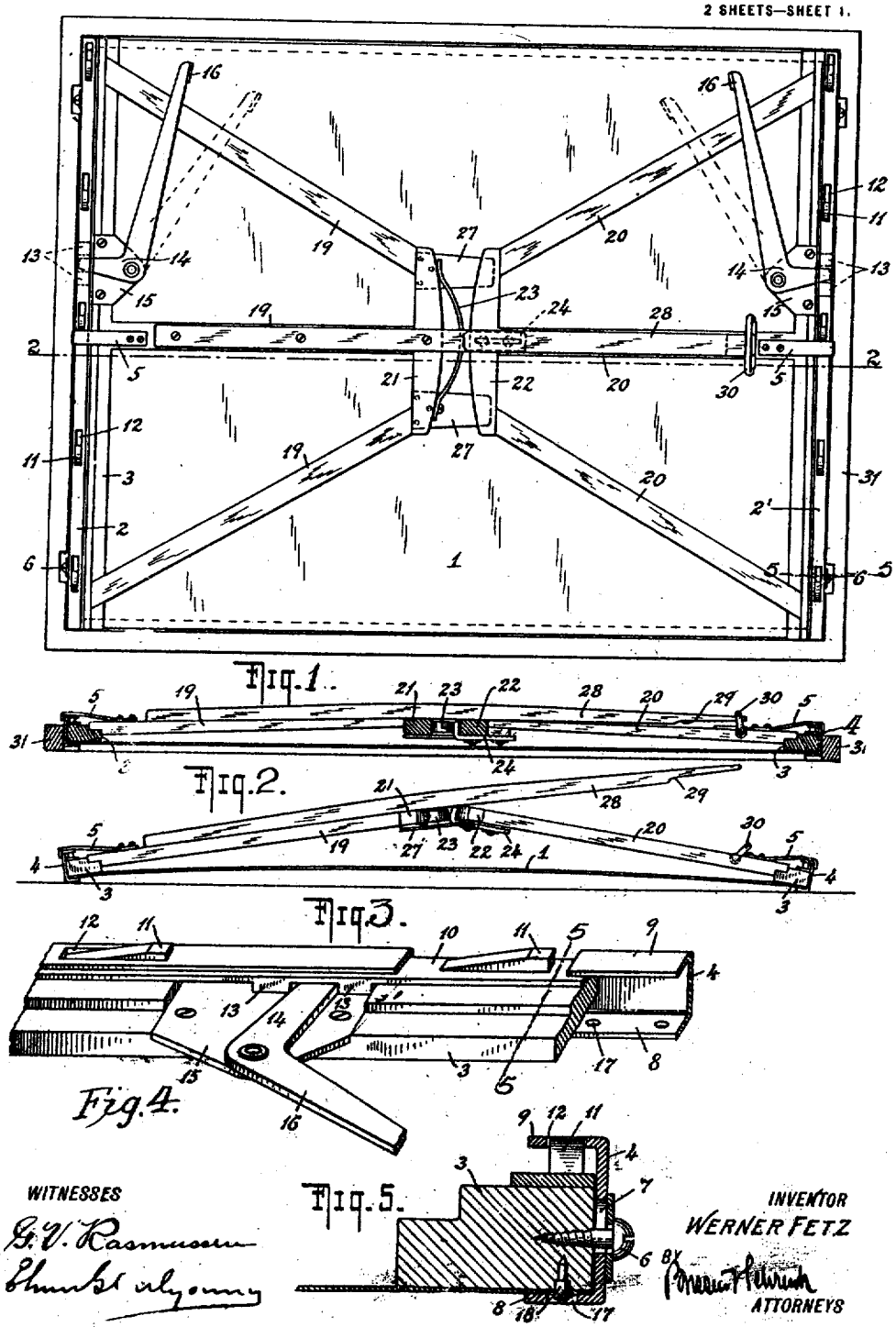

UNITED STATES PATENT OFFICE.

WERNER FETZ, OF NEW YORK, N. Y.

PHOTOGRAPHIC-FILM HOLDER.

1,294,079.      Specification of Letters Patent.      Patented Feb. 11, 1919.

Application filed May 6, 1918. Serial No. 232,713.

*To all whom it may concern:*

Be it known that I, WERNER FETZ, a citizen of the United States, residing in the county of Bronx, city and State of New York, have invented certain new and useful Improvements in Photographic-Film Holders, of which the following is a specification.

My invention relates to holders for flexible photographic films or papers by means of which said films or papers may be held either for original exposure or in enlarging operations; or for development and other subsequent manipulation.

In the use of sensitized films or papers for photographic purposes, one of the greatest manipulative difficulties encountered, particularly during the process of exposure, has been to keep the film or paper perfectly flat, as is, of course, necessary in order that it may coincide with the focal plane. When but small areas are involved, say up to 6¼x8¼ or even up to 8x10, the various modes of holding the film which have been suggested, such as, for example, supporting it between two spools, or placing it in an ordinary frame, have been found fairly satisfactory. However, when exposures larger than those mentioned have been in question, it has been found that films supported between two spools, or in the usual frame, will not lie sufficiently flat to coincide accurately with the plane of the projected image. And if the film be pressed between glass plates, as has been suggested and attempted, then scratches, dust particles, streaks due to electrification, and other similar defects are almost certain to develop in the film.

The object of my invention about to be described is to provide a simple, practical holder adapted to have a sensitized film quickly fastened thereto or removed therefrom and to lightly stretch said film in such a way as to subject the film to uniform but gentle tension over its entire surface and to bring all parts of its surface into one and the same plane. A further object of my invention is to provide a holder of the character specified such that the tension in the film will be even and uniform over its entire surface regardless of the fact that the two ends to which the stretching forces are applied may not be parallel to one another.

Essentially, my invention comprises a pair of film edge holding members having narrow clamps adapted to be slid over opposite edges or ends of the film, each clamp being provided with an operative handle for gripping the two coöperating members of the clamp tightly upon the film. The clamps are respectively attached to the outer ends of a pair of thrust members whose inner ends, one or both of which is resilient, will abut when said thrust members are approaching coincidence with a common plane behind that of the film and parallel therewith. By then forcing the thrust members into complete coincidence with said plane, the clamps will be pushed away from one another and the film stretched with a force dependent upon the stiffness of the resilient abutment end above referred to. Provision is made for locking the thrust members together in this ultimate position.

The inner abutting ends of the thrust members are arranged to rock upon one another in their own plane so that, even if the edges of the film gripped by the clamps are not originally parallel to one another, nevertheless the tension in the film will be uniform over the entire surface thereof.

The holder when in use and film stretched, is placed in a kit or plate holder of usual construction.

My invention will be better understood by referring to the accompanying drawings in which Figure 1 represents a rear view of a preferred form of my improved holder with a film in place therein; Fig. 2 represents a longitudinal section, taken along the line 2—2 of Fig. 1; Fig. 3 represents an elevation, taken from the edge (bottom of Fig. 1), the holder being shown with the film in unstretched or slack position; Fig. 4 represents a perspective view, enlarged, showing the detailed construction of the clamps by which the edges of the film are gripped; Fig. 5 represents a transverse section, still further enlarged, through one of the clamps, along the line 5—5 of Figs. 1 and 4, for example; Fig. 6 represents a view similar to Fig. 1 but taken from the front of the holder, the central part of the film being broken away so as to show the construction of the abutting ends of the thrust members; Fig. 7 is a transverse section taken along the line 7—7 of Fig. 6; Fig. 8 is a perspective view, enlarged, showing the adjustable abutment between the thrust members; and Fig. 9 is a perspective view, on the same scale as Fig. 8, showing the locking device for the thrust members as the same appears when locked and with the film in stretched position.

In the drawings, the film 1 has its opposite ends gripped by narrow clamps 2, 2'. Each of these clamps comprises a cross bar or fixed member 3 and a movable or gripping member 4 attached to the cross bar by a spring 5 and by screws 6; the gripping member 4 is of channel-shaped section and its legs embrace the cross bar 3 as shown in the figures, the distance between the legs, however, being substantially greater than the thickness of said cross bar. Transverse slots 7, through which screws 6 pass, are provided in the gripping member, thus enabling said member to swing or move transversely with reference to the cross bar upon this spring 5. Spring 5 is given an initial set so that it tends normally to keep the front leg 8 of the gripping member away from the front side of the cross bar 3.

Upon the rear side of cross bar 3 and between it and the rear leg 9 is a linearly slidable strip 10 provided with a plurality of spaced cams or wedges 11; the leg 9 is provided with a plurality of spaced slots 12 through which the cams 11 will project for one position of strip 10. Upon the lower side of strip 10 is a pair of spaced lugs 13 between which enters one end of a bell crank operating lever 14 pivoted upon a plate 15 attached to the back inner side of the cross bar 3. As the handle 16 of this operating lever is moved in one direction or the other, the strip 10 carrying the cams 11 will be correspondingly slid, thus raising gripping member 4 against the pressure of spring 5 and causing the leg 8 to tightly grip against the cross bar, or, on the other hand, allowing it to be pushed therefrom by the action of spring 5 as the case may be.

Leg 8 is provided with a plurality of holes 17 placed fairly close together, say about ¾" to 1" apart; and pins 18 having rounded outer ends, and a diameter substantially smaller than that of holes, 16, are set in the cross bar 3, concentric with said holes and so as to just project slightly beyond the surface of the cross bar and into the holes when the leg 8 is drawn up against the cross bar.

The two clamps are attached respectively to the outer ends of thrust members 19, 20, each of which comprises a light but rigid skeleton framework whose inner ends terminate respectively in plates 21, 22. One of these plates, 21, has one end of a leaf spring, 23, attached to its inner edge, the other end of the spring being adapted to slide upon said edge, when said spring is flattened. And the other plate, 22, carries an abutment, 24, attached to it by screws, 25, passing through a slot 26; the abutment may thus be linearly adjusted.

At the extremities of plate 21, and on the front side thereof are provided inwardly projecting guide plates, 27, having forwardly bent ends. And upon the back of this same plate and of the thrust member, 19, to the inner end of which said plate is attached, there is fastened a locking bar, 28, an end of which is free and extends well beyond the plate, 21. The front side of this locking bar is substantially flat except at and near the extreme end where a portion is cut away as at 29.

Thrust member, 20, belonging to clamp, 2', has a flat loop or ring of wire, 30, pivotally attached thereto at such a point that when the two thrust members are abutted and in substantially the same plane the ring may be swung over the end of the locking bar, 28, (as shown in Figs. 1, 2, and 9) or swung free therefrom (as shown in Fig. 3).

In using the holder of my invention, opposite edges (preferably the shorter edges) of the film are respectively slid between the leg, 8, and the cross bar, 3, of the two clamps. The handle, 16, must, of course, first have been thrown to its extreme outward position (shown dotted, Fig. 1, and also shown in Fig. 4), thus permitting leg, 8, to space itself away from the cross bar under the influence of spring, 5. Each film edge should be pushed into the clamp until it is stopped by the web of the gripping member, 4. As each film edge is thus positioned, the corresponding operating handle, 16, is pushed inwardly toward the clamps, thus causing strip, 10, to move linearly under leg 9 and forcing cams, 11, out of the slots, 12, thereby forcibly pressing leg, 8, toward the cross bar and gripping the film between the leg and cross bar. Pins, 18, being substantially smaller than holes, 17, but concentric therewith and having rounded ends, will indent the film edge and push it into holes 17 for a short distance without breaking or cutting the film; the film edge will therefore be held very tightly and firmly between the leg, 8, and the cross bar.

The two film edges having been respectively gripped by the two clamps, said film with the two members of the holders is laid in the kit or plate holder, 31, with the thrust members on the rear side thereof (as shown in Fig. 3). As the inner ends of the two members are lowered toward a common plane, the inner end of thrust member, 20, should be entered between the locking bar 28 and the guide plates 27. If the clamps and thrust members have been suitably selected for the particular size of film which is being dealt with, the end of abutment, 24, should now engage the leaf spring, 23. If it does not thus engage the leaf spring, then it should be adjusted linearly by means of screws, 25, until it does so engage.

The two thrust members should now be pushed forwardly until they lie substantially in a common plane parallel to the plane of the film, as shown in Fig. 2. As the thrust members thus move from the position shown in Fig. 3 to that shown in Fig. 2, the leaf spring, 23, will be compressed, thus putting tension upon the film and bringing all portions of said film into a single plane. When the thrust members have been forced sufficiently forward to bring them into a common plane, the free end of locking bar, 28, will lie against the thrust member, 20, of clamp, 2', in such proximity to the loop, 30, that said loop may be swung over the end of the locking bar, thereby permanently locking the two members of the holder together with the film in stretched condition. Owing to the end of the locking bar being cut away at, 29, the effective resilience between the two clamps by which they are thrust apart is obviously increased.

The stretching of the film will be uniform over its entire area whether or not the two clamps are themselves parallel; that is to say whether or not the two film edges are parallel. This is because of the fact that the inner or abutting ends of the thrust members engage one another at one point only (the point of contact of abutment, 24, with leaf spring, 23,) and therefore the two members of the holder are able to rock upon and with reference to one another in their common plane.

As above suggested, it is of course necessary that the holders be constructed with some reference to the size of the film to be dealt with. Certain variations in the length of the film may, of course, be taken care of by adjusting abutment, 24. But, in practice, for extreme differences of length of film, it would probably be preferable to use holders whose thrust members are correspondingly different in length. Such cases would not necessarily require that both members of the holder be changed. Thus, assuming that, as illustrated in the drawings, the film is 20x24 inches, the clamps being thus 20 inches long, the next smaller standard film is 16x20 inches. In such case the holder member carrying the locking bar might remain the same and be applied to the longer (20 inch) edge of the 16x20" film. The other holder member having the loop, 30, would alone require to have a shorter thrust member. In this way, one holder member having a locking bar and two mating holder members having thrust bars of different lengths would be sufficient for these two standard sized films.

The kit or plate holder should be rabbeted not only at its ends, where indeed it is absolutely essential to receive the two clamps, but also at the sides so as to afford a support for the free edges of the film which are otherwise apt to curl slightly.

The kit should obviously also be a little longer than the maximum distance between the outer edges of the two clamps in order that in all cases and despite small variations in the length of the film, ample room may be afforded for the film to be stretched.

Many changes in detail may be made in the construction of my improved holder within the spirit of the invention and scope of the claims. Thus, the clamp members may be gripped together by means other than the wedge shaped cams which are illustrated. The locking bar and ring also may be equivalented by other locking means. Similarly the leaf spring and adjustable abutment at the ends of the two thrust members may have other equivalent structures substituted for them. Such changes will readily occur to the skilled mechanic.

What I claim is—

1. In a photographic film holder, a pair of clamps adapted to grip opposite edges of a film, thrust members respectively attached to the inner side of each clamp, the free ends of said members being adapted to abut resiliently when the film is thus gripped as the thrust members are approached to but before they reach a common plane, and locking means for holding the thrust members in said common plane.

2. In a photographic film holder, a pair of clamps adapted to grip opposite edges of a film, thrust members respectively attached to the inner side of each clamp, the free end of one of such members being resilient and the free ends of both of said members being adapted to abut when the film is thus gripped as the thrust members are approached to but before they reach a common plane, and locking means for holding the thrust members in said common plane.

3. In a photographic film holder, a pair of clamps adapted to grip opposite edges of a film and thrust members between said clamps adapted to abut resiliently upon one another at substantially a single point when the film is thus gripped, whereby the film is uniformly tensioned over its whole area.

4. In a photographic film holder, a pair of clamps adapted to grip opposite edges of a film, and resilient means between said clamps whereby they are pressed apart when the film is thus gripped, the clamps being relatively movable angularly in their common plane.

5. In a photographic film holder, a pair of clamps adapted to grip opposite edges of a film, thrust members respectively attached to the inner side of each clamp and adapted to abut resiliently at a single point when said thrust members are in a common plane so that the clamps are relatively movable in their common plane about the abutting point, whereby the film is tensioned uniformly over its area.

6. In a photographic film holder, a clamp comprising a cross bar, a channel sectioned gripping member attached to and embracing said cross bar and movable transversely thereto, the distance between the channel legs being greater than the thickness of the cross bar, and a wedge shaped cam adapted to be forced into or out of the free space between a channel leg and the cross bar so as to press the other channel leg against the other side of the cross bar.

7. In a photographic film holder, a pair of linearly disposed clamping members adapted to receive a film edge therebetween one of said members having a plurality of pins projecting slightly beyond its surface and the other member having a plurality of holes substantially larger but respectively concentric with the pins, so that the film edge, when it is clamped, is indented but not punched or cut.

8. A photographic film holder comprising a kit and a clamping device comprising a pair of clamps adapted to grip opposite edges of a film, said clamps being connected by linearly resilient members which tend to press the clamps apart and which permit relative angular motion of the clamps in their common plane, the kit having a rabbet on the edges at right angles to the clamps against which the corresponding edges of the film are adapted to lie.

9. In a photographic film holder, a pair of clamps adapted to grip opposite edges of a film, thrust members respectively fixed to the inner side of each clamp and abutting when said members are in a common plane and locking means for retaining said members in said common plane.

10. In a photographic film holder, a pair of clamps adapted to grip opposite edges of a film, thrust members respectively fixed to the inner side of each clamp and abutting resiliently when said members are in a common plane and locking means for retaining said members in said common plane.

In testimony whereof I have hereunto set my hand.

WERNER FETZ.